(12) United States Patent
Sugiyama et al.

(10) Patent No.: US 8,776,104 B2
(45) Date of Patent: Jul. 8, 2014

(54) INFORMATION PROVIDING SYSTEM USING VIDEO TRACKING

(75) Inventors: Itsuo Sugiyama, Tokyo (JP); Minoru Matsumoto, Sakura (JP)

(73) Assignee: Crawler Research Institute, Inc., Tokyo (JP)

( * ) Notice: Subject to any disclaimer, the term of this patent is extended or adjusted under 35 U.S.C. 154(b) by 193 days.

(21) Appl. No.: 13/138,979

(22) PCT Filed: Oct. 6, 2010

(86) PCT No.: PCT/JP2010/067526
§ 371 (c)(1),
(2), (4) Date: Nov. 8, 2011

(87) PCT Pub. No.: WO2011/046051
PCT Pub. Date: Apr. 21, 2011

(65) Prior Publication Data
US 2013/0117772 A1    May 9, 2013

(30) Foreign Application Priority Data

Oct. 13, 2009    (JP) ................................ 2009-236664

(51) Int. Cl.
*H04N 7/16* (2011.01)
(52) U.S. Cl.
USPC ........................................... 725/14; 725/135
(58) Field of Classification Search
USPC .................................................. 725/14, 135
See application file for complete search history.

(56) References Cited

U.S. PATENT DOCUMENTS

| 5,983,200 | A  | * | 11/1999 | Slotznick ................... 705/26.43 |
| 7,383,563 | B1 | * | 6/2008  | Rashkovskiy .................. 725/58 |
| 8,266,522 | B2 | * | 9/2012  | Dugonjic et al. ............. 715/234 |
| 2009/0006177 | A1 | * | 1/2009  | Beaver et al. ................... 705/10 |

FOREIGN PATENT DOCUMENTS

| JP | 2002-218433 A | 8/2002 |
| JP | 2006-033026 A | 2/2006 |
| JP | 2008-160201 A | 7/2008 |
| JP | 2008-257524 A | 10/2008 |
| JP | 2009-118502 A | 5/2009 |
| JP | 2009-182935 A | 8/2009 |
| WO | 2006/116196 A2 | 11/2006 |

OTHER PUBLICATIONS

International Search Report, directed to International Patent Application No. PCT/JP2010/067526, 4 pages.

* cited by examiner

*Primary Examiner* — Pankaj Kumar
*Assistant Examiner* — Franklin Andramuno
(74) *Attorney, Agent, or Firm* — Smith Patent Office

(57) ABSTRACT

Provided is an information providing system using video tracking, such that tracking of an original image can be performed without editing/processing the original video and without requiring a high level programming knowledge, and information can thus be easily provided. The system is configured so that an overlay screen (10) is superimposed on an original video screen (2) and displayed in synchronization with the original video, said overlay screen (10) provided with a transparent or translucent object graphic (5) acting as control information corresponding to a predetermined purpose of providing information, with respect to an object (4) represented by an original video image which is displayed on the original video screen (2) once or a plurality of times in accordance with the situation.

6 Claims, 13 Drawing Sheets
(5 of 13 Drawing Sheet(s) Filed in Color)

INFORMATION PROVIDING SYSTEM USING VIDEO TRACKING

TECHNICAL FIELD

The present invention relates to an information using video tracking.

BACKGROUND ART

In the past, as view information about a video on a communication network such as the Internet, no information can be obtained other than viewing-start information indirectly obtained when starting a video player and viewing-end information indirectly obtained when stopping a video player, and when the number of links to a video is obtained, it is simply deemed as viewings of the video. It is desired to effectively collect user's viewing behavior, e.g., in which portion of which screen a user is interested within a timeline of a video on the Internet or a screen, at which position the user stops the video, and in which portion the user repeatedly play the video.

On the other hand, Patent Document 1 suggests a technique for selecting a desired trail of an object moving within a screen and displaying detailed information at that occasion. Patent Document 2 suggests a technique for adding various sub-contents to a video object successively changing in a video program motion picture which a user is viewing.

PRIOR ART DOCUMENTS

Patent Document 1: Japanese Patent Application Laid-Open No. 2008-257524
Patent Document 2: Japanese Patent Application Laid-Open No. 2002-218433

DISCLOSURE OF THE INVENTION

Problems to be Solved by the Invention

However, in the above conventional example, it is necessary to edit an original video in order to add additional information to a screen of a video. In this case, it can be generated in a form of meta data (data describing matters related to original video data) during generation of the video, but it is difficult to add the additional information after the video is completed. Further, when a video is planned, it is difficult to predict all possible intended purposes, and there is a problem in that this imposes limitations on the purpose of the video. When a particular operation for a target object in an original video is implemented, there used to be great limitations on bidirectional use of the video due to such limitations that a special program is required which can be generated by only a person having high level programming skill.

The present invention solves the above problems, and it is an object of the present invention to provide an information providing system using video tracking capable of easily providing information by tracking an original image without requiring high level programming skill and without editing and processing the original video.

Means for Solving the Problem

A first configuration of an information providing system using video tracking according to the present invention for achieving the above object is characterized in that a transparent or semitransparent overlay screen, in which control information according to purpose of providing predetermined information is provided on a target object represented by an original video image displayed once or a plurality of times according to scenes within an original video screen, is configured to be superimposed on the original video screen and configured to be displayed in synchronization with the original video.

A second configuration of an information providing system using video tracking according to the present invention is based on the first configuration and further includes an original video replay unit for reproducing an original video, a coordinate calculation unit for calculating coordinate information at a replay clock at which a particular target object is currently displayed, from at least an initial image and a last image in a period in which the particular target object of the original video replayed by the original video replay unit is displayed within the original video screen, an object figure drawing unit for drawing an object figure superimposed on the original video screen in the overlay screen on the basis of the coordinate information calculated by the coordinate calculation unit and adding the control information to the object figure, and an object figure video replay unit for reproducing an object figure video drawn by the object figure drawing unit in synchronization with the original video replayed by the original video replay unit.

A third configuration of an information providing system using video tracking according to the present invention is based on the second configuration and further includes a control unit for executing at least one of the following operations, i.e., opening a predetermined web site set in advance, opening another predetermined video, and opening predetermined advertisement information, by clicking the object figure.

A fourth configuration of an information providing system using video tracking according to the present invention is based on the second and third configurations and further includes an information statistics processing unit for collecting and statistically calculating at least one of viewing ranking information about a particular target object of the original video including a number of times the object figure replayed by the object figure video replay unit is clicked, replay/stop information for each replay time of the original image when the object figure is clicked, viewing ranking information about a particular target object of the original video including a number of times each of a plurality of object figures arranged on the overlay screen is clicked, and viewing history information of each viewing user.

A fifth configuration of an information providing system using video tracking according to the present invention is based on the third configuration and is characterized in that a communication unit is provided in the object figure video replay unit, and the communication unit communicates, via the Internet to the server apparatus, at least one of the information such as viewing ranking information about a particular target object of the original video including a number of times the object figure replayed by the object figure video replay unit is clicked, replay/stop information for each replay time of the original image when the object figure is clicked, viewing ranking information about a particular target object of the original video including a number of times each of a plurality of object figures arranged on the overlay screen is clicked, and viewing history information of each viewing user, which are collected and statistically calculated by the information statistics processing unit. While the object figure video replay unit is operating, the communication unit transmits an alive indication signal with a regular interval, so that when the original video replay unit and object figure video replay unit are forcibly terminated by an outside, the server apparatus can recognize termination of viewing by detecting loss of the alive indication signal.

Effect of the Invention

According to the first configuration of the information providing system using video tracking according to the present invention, the transparent or semitransparent overlay screen, in which the control information according to purpose of providing predetermined information is provided on the target object represented by the original video image displayed once or a plurality of times according to scenes within an original video screen, is configured to be superimposed on the original video screen and displayed in synchronization with the original video. Desired information can be provided using the control information provided on the overlay screen superimposed on the original video screen without editing and processing the original video.

According to the second configuration of the information providing system using video tracking according to the present invention, the coordinate calculation unit can calculate coordinate information at a replay clock at which the particular target object is currently displayed, from at least the initial image and the last image in a period in which the particular target object of the original video is displayed within the original video screen. Then, the object figure drawing unit draws the object figure superimposed on the original video screen in the overlay screen on the basis of the coordinate information calculated by the coordinate calculation unit and adds the control information to the object figure. Then, the object figure video replay unit can replay an object figure video drawn by the object figure drawing unit in synchronization with the original video replayed by the original video replay unit.

According to the third configuration of the information providing system using video tracking according to the present invention, when the object figure is clicked, the control unit can provide desired information by opening a predetermined web site set in advance related to the particular target object of the original video, predetermined another video, predetermined advertisement information.

According to the fourth configuration of the information providing system using video tracking according to the present invention, the information statistics processing unit can collect and statistically calculate, as necessary, viewing ranking information about a particular target object of the original video including the number of times the object figure replayed by the object figure video replay unit is clicked, replay/stop information for each replay time of the original image when an object figure is clicked, viewing ranking information about a particular target object of the original video including the number of times each of a plurality of object figures arranged on the overlay screen is clicked, and viewing history information of each viewing user. When the above information is output, useful statistical data about the view information of the original video can be obtained, and this enables bidirectional use by the video provider and by the video viewer.

According to the fifth configuration of the information providing system using video tracking according to the present invention, while the object figure video replay unit is operating, the communication unit transmits the alive indication signal with a regular interval, so that when the original video replay unit and object figure video replay unit are forcibly terminated by the outside, e.g., abnormal termination of a personal computer and the like of the viewer, the server apparatus can recognize termination of viewing by detecting loss of the alive indication signal. Therefore, this prevents the server apparatus from falsely recognizing that the replay of the object figure video is continuing when monitoring is performed by an ordinary method.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 13(a) is a viewing and event occurrence state in units of sites. FIG. 13(b) is an event occurrence state in units of videos. FIG. 13(c) is a figure illustrating a viewing history in units of user classes.

MODES FOR CARRYING OUT THE INVENTION

An embodiment of an information providing system using video tracking according to the present invention will be specifically explained with reference to the drawings.

Figure 1:
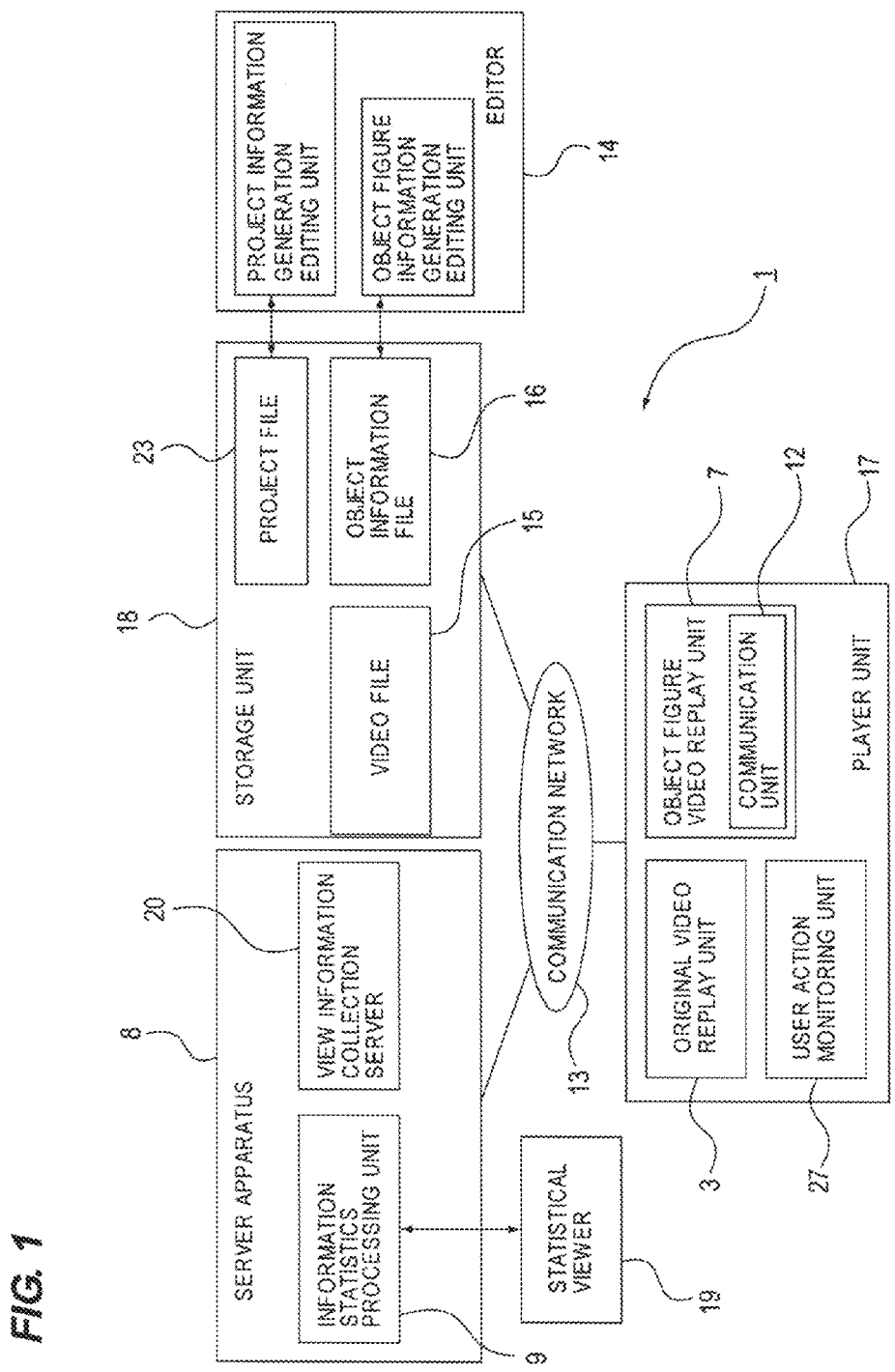
FIG. 1 is a block diagram illustrating an entire configuration of an information providing system using video tracking according to the present invention.
Figure 5:
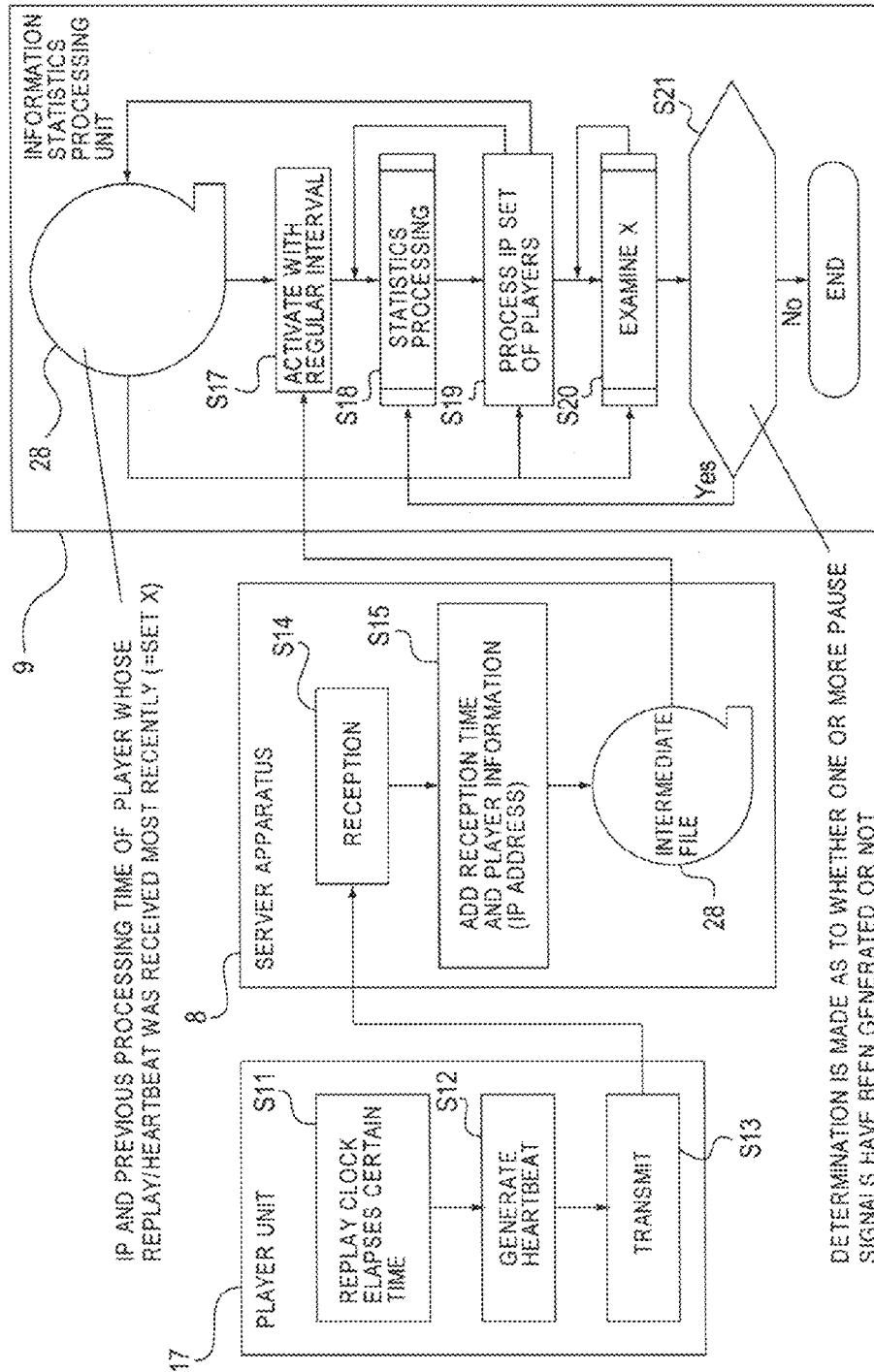
FIG. 5 is a figure for explaining communication between the player unit and the server apparatus.

In FIG. 1, numeral 1 denotes an information providing system using video tracking. As shown in FIGS. 8, 10 to 12, a transparent or semitransparent overlay screen 10, in which an object FIG. 5 serving as control information according to purpose of providing predetermined information is provided on a target object 4 represented by an original video image displayed once or a plurality of times according to scenes within an original video screen 2, is configured to be superimposed on the original video screen 2 and configured to be able to be displayed in synchronization with the original video. This gives meaning to the target object 4 existing as a bitmap image on the original video, and the object FIG. 5 that can activate a desired function is associated therewith. The original video image is recorded in a generally-available video image recording format such as MPEG (which stands for Moving Picture Expert Group, one of video and audio compression methods) and FLV (a video file format developed by Adobe Systems Incorporated as a video format for playback on a Flash, i.e., a product of Adobe Systems Incorporated). An input file and the object FIG. 5 are recorded in Extensible Markup Language (XML) file format.

Figure 2:
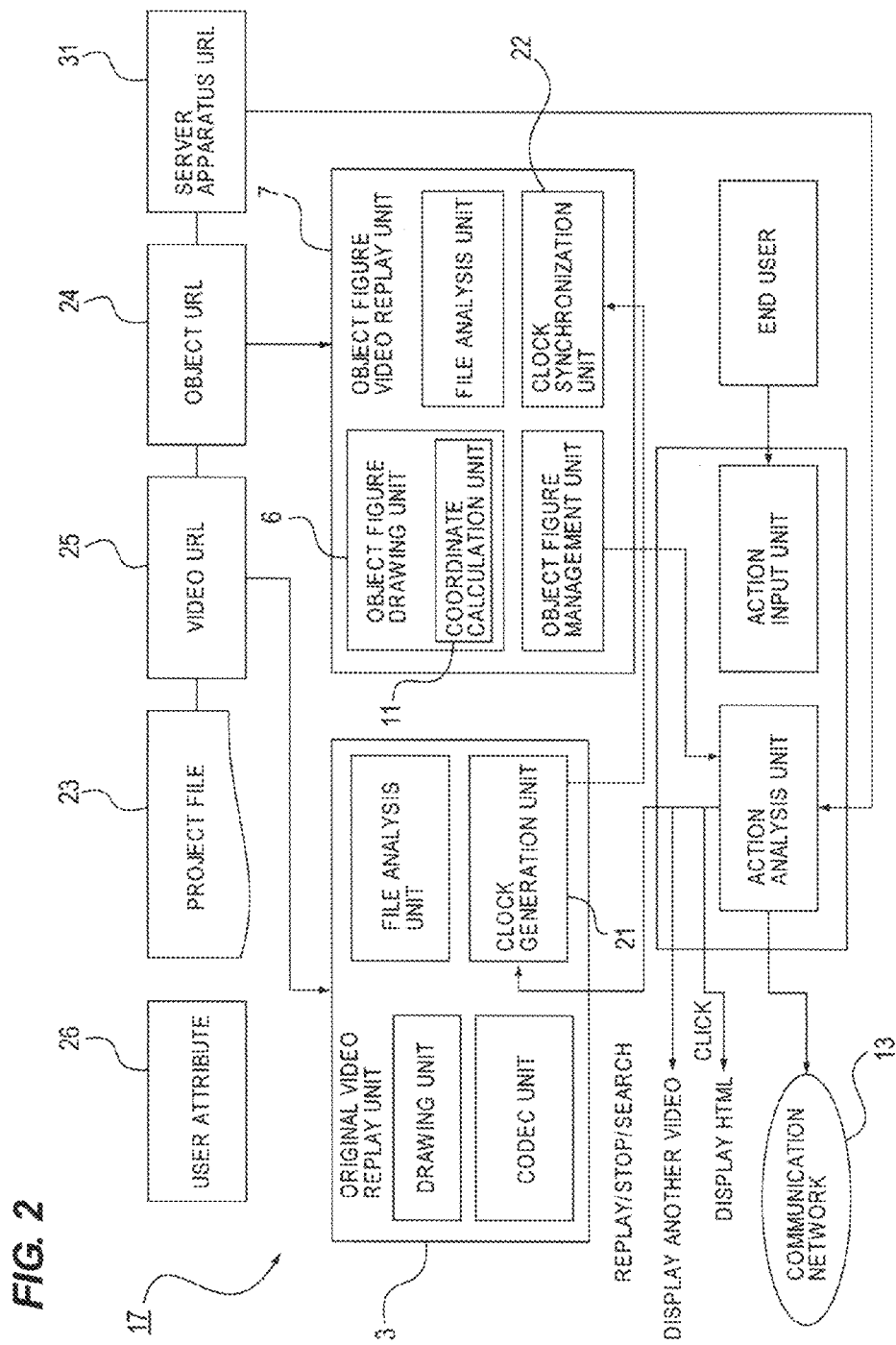
FIG. 2 is a block diagram illustrating a configuration of a player unit.

As shown in FIGS. 1 and 2, the information providing system using video tracking 1 has a coordinate calculation unit 11 for calculating coordinate information at a replay clock at which a particular target object 4 is currently displayed, from at least an initial image and a last image in a period in which the particular target object 4 of the original video replayed by the original video replay unit 3 is displayed within the original video screen 2. More specifically, the object FIG. 5 serving as the control information is drawn on the overlay screen 10 so as to correspond to the particular target object 4 displayed on the original video screen 2 at a predetermined replay clock of the original video, and the drawing coordinate of the object FIG. 5 is calculated by the coordinate calculation unit 11 provided in the object figure drawing unit 6.

Figure 9A:
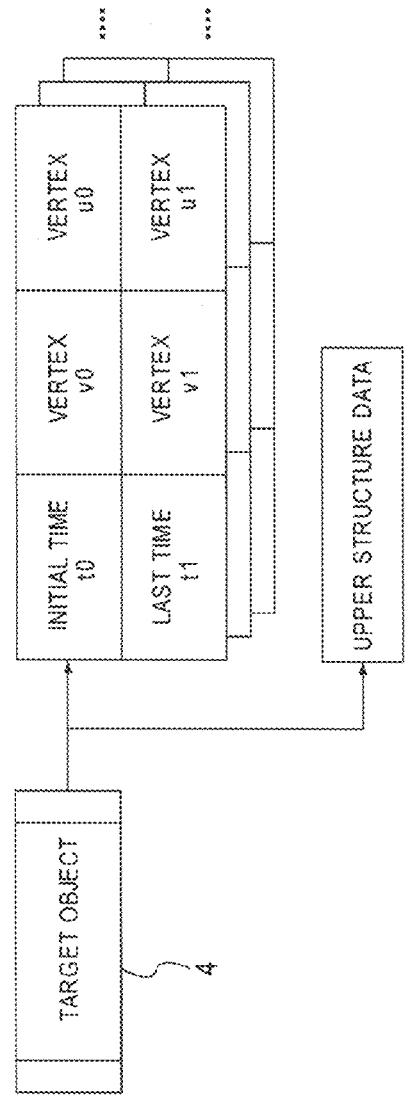
FIGS. 9(a), 9(b) are figures for explaining principle of causing a coordinate calculation unit to calculate coordinate information in a replay clock in which a particular target object of an original video is currently displayed.
Figure 9B:
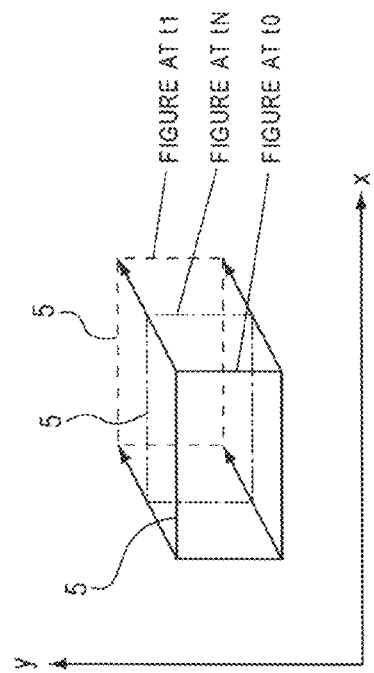

As shown in FIG. 9, first, a plurality of vertexes of the particular target object 4 of the original video replayed by the original video replay unit 3 at a predetermined replay clock time t are extracted on the overlay screen 10 superimposed on the original video screen 2. The coordinate calculation unit 11 sets vectors v, u, . . . having origin points at predetermined coordinate positions set in advance on the overlay screen 10 (on the original video screen 2) corresponding to the plurality of vertexes. Then, the particular target object 4 of the original video calculates vertex coordinate vectors v0, u0 of the particular target object 4 of the original video at an initial replay clock time t0 as an initial image in a period in which the particular target object 4 of the original video is displayed within the original video screen 2, vertex coordinate vectors v1, u1 of the particular target object 4 of the original video at a last replay clock time t1 as a last image in a period in which the particular target object 4 of the original video is displayed within the original video screen 2, and further vertex coordinate vectors vn, un of the particular target object 4 of the original video at a predetermined intermediate replay clock time tn as an intermediate image in a period in which the particular target object 4 of the original video is displayed within the original video screen 2, As shown in FIG. 9(b), the vertex coordinate vector vn at the replay clock time tn (t0<tn<t1) is represented by the following Expression 1.

$$vn = v0 + (v1-v0) \times \{(tn-t0)/(t1-t0)\}$$ [Expression 1]

Figure 10B:
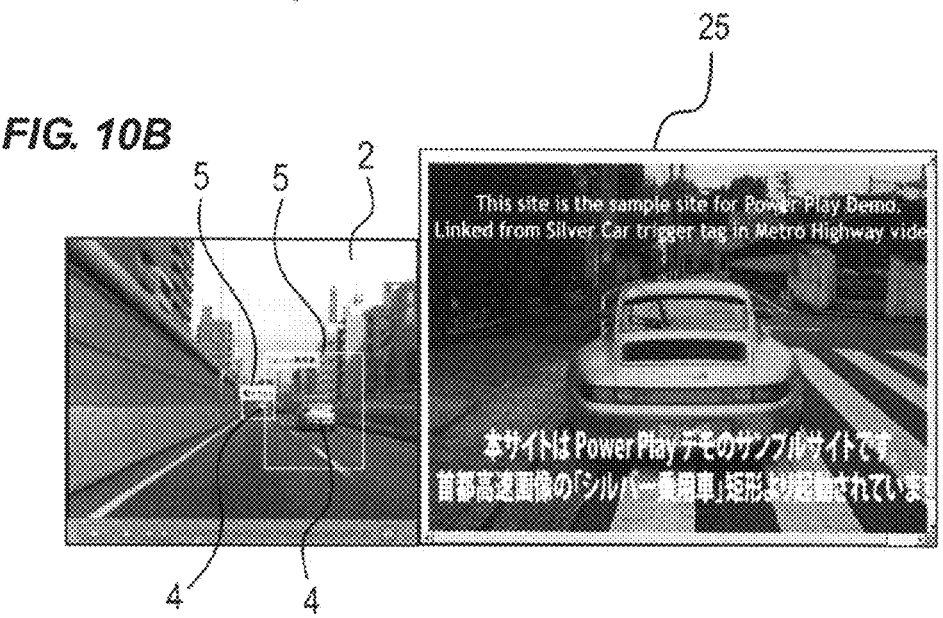
FIG. 10(b) is a figure illustrating how two object figures respectively track a lightweight truck and a silver passenger car running in a highway, i.e., two particular target objects of an original video, and one of them is clicked, so that a web site related to the silver passenger car, i.e., the target object thereof, is opened.
Figure 11A:
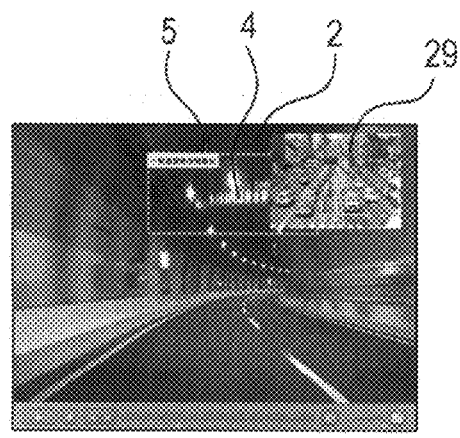
FIG. 11(a) is a figure illustrating how an ordinary road traffic jam information video is opened by clicking an object figure tracking a traffic information display panel, i.e., a particular target object of an original video.
Figure 11B:
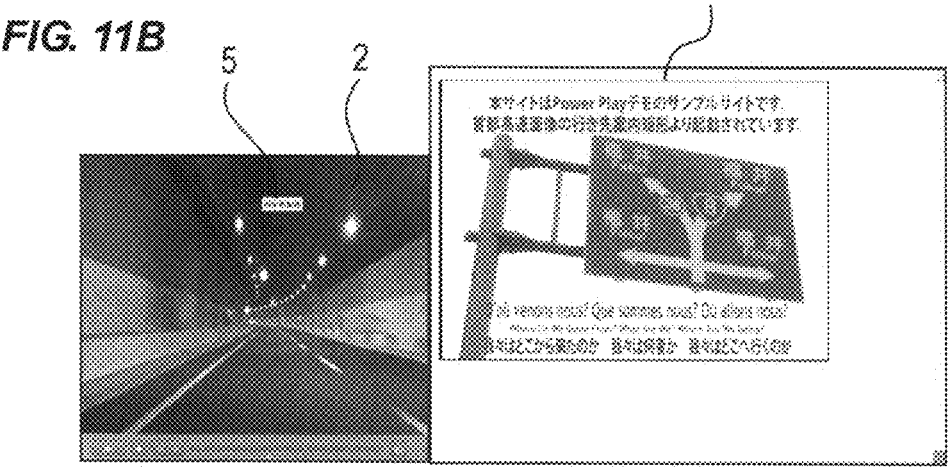
FIG. 11(b) is a figure illustrating how a destination guide board image is opened by clicking an object figure of a destination guide, i.e., a particular target object of an original video.

Further, the information providing system using video tracking 1 has an object figure drawing unit 6 for drawing the object FIG. 5 superimposed on the original video screen 2 in the overlay screen 10 on the basis of the coordinate information calculated by the coordinate calculation unit 11 and adding the control information to the object FIG. 5. As shown in FIG. 10(b), the object FIG. 5 may appear at a plurality of places at a certain point of time during replay, may be displayed as a frames of a rectangle, a circle, or a triangle, and may be displayed as a caption as shown in FIG. 11(b).

Figure 8:
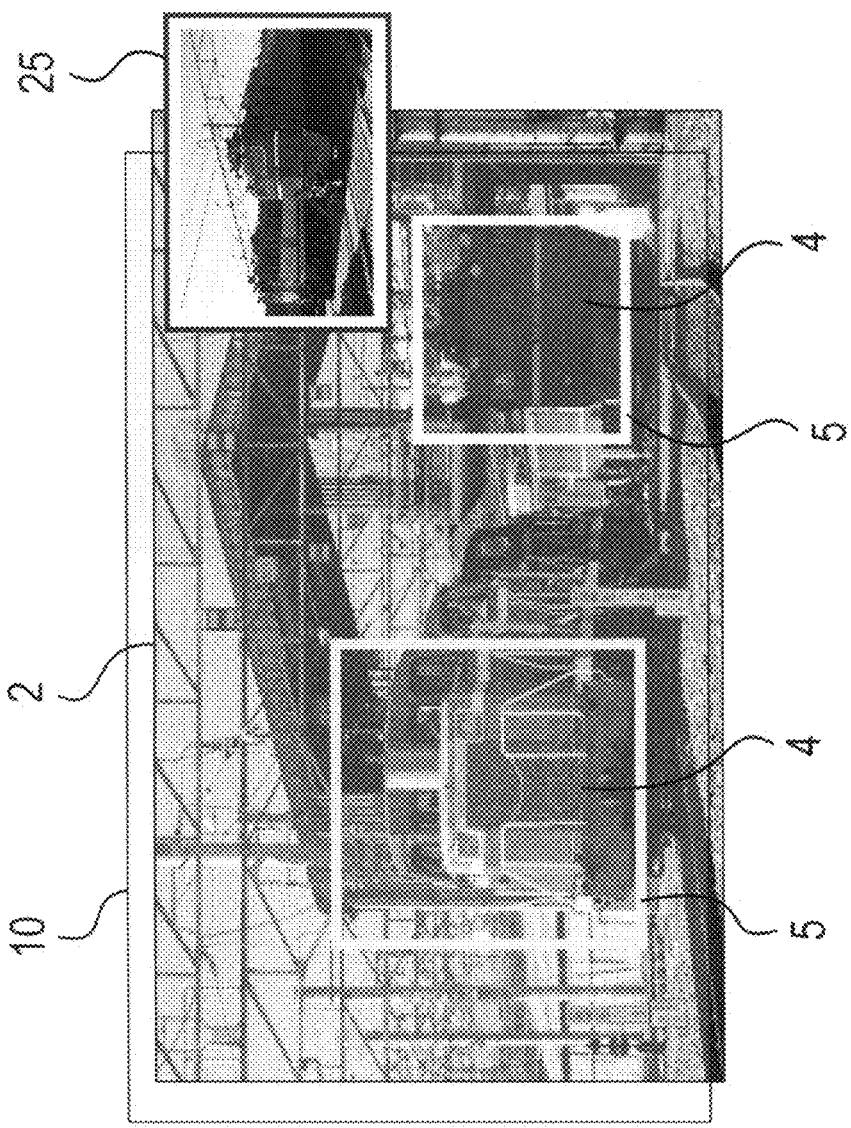
FIG. 8 is a schematic diagram for explaining a configuration in which an overlay screen is superimposed on an original video screen.

FIG. 8 is a schematic diagram for explaining a configuration in which the overlay screen 10 is superimposed on the original video screen 2. However, it should be noted that the overlay screen 10 is superimposed immediately above the original video screen 2 without any displacement. Numeral 5 denotes a rectangle object figure arranged on the overlay screen 10. When the object FIG. 5 is defined on the target object 4 of the original video to provide information to viewers, the target object 4 on the original video screen 2 is seen by using an editor 14 as shown in FIG. 1, and the object FIG. 5 is defined onto the target object 4 of the original video. For example, when a rectangular object FIG. 5 is defined as shown in FIG. 8, coordinates at two points, i.e., an upper left and a lower right of the rectangle, are specified, so that the rectangle object FIG. 5 can be defined. When a circular object FIG. 5 is defined, coordinates at two points, i.e., a coordinate of a central point of a circle and a coordinate of a point on the periphery (radius), are specified, so that the circular object FIG. 5 can be defined. When an elliptic object FIG. 5 is defined, coordinates at two points, i.e., an upper left and a lower right, are specified, so that the elliptic object FIG. 5 inscribed in the specified rectangle can be defined. When a triangular object FIG. 5 is defined, coordinates of three vertexes are respectively specified, so that the triangular object FIG. 5 can be defined. Alternatively, it may be a hidden object FIG. 5, which cannot be seen by a viewer.

In addition, the information providing system using video tracking 1 has an object figure video replay unit 7 for replaying an object figure video drawn by the object figure drawing unit 6 in synchronization with the original video replayed by the original video replay unit 3.

On the basis of the coordinate information obtained by calculating the vertexes of the particular target object 4 of the original video as described above, a desired number of overlay screens 10 in which the object FIG. 5 is drawn are generated corresponding to the original video, and they are advanced frame by frame in synchronization with the replay of the original video, so that they can be made into a video. As described above, the object FIG. 5 drawn on the overlay screen 10 constituted by the video layer is replayed as the video. As a result, for the viewer, the object FIG. 5 appears to be an addition of a new indication on the original video.

The information providing system using video tracking 1 has a communication unit 12 capable of communicating with a server apparatus 8. When the object FIG. 5 displayed on the overlay screen 10 is clicked, a user action monitoring unit 27 serving as a control unit executes at least one of the following operations, i.e., opening a predetermined web site set in advance, opening another predetermined video, and opening predetermined advertisement information.

An object information file 16 provided in a storage unit 18 as shown in FIG. 1 stores a file main body (XML file) associated with an object URL 24 (URL (Uniform Resource Locator; denotation indicating a location of information resource (such as documents and images) existing on the Internet)) information as shown in FIG. 2. The video file 15 stores the file main body associated with the URL information, pointed by a video URL 25. The video file 15 and the object information file 16 are independent from each other on the communication network 13 such as the Internet, and both can be activated at the same time. A project file 23 is a file that is input to a player unit 17, and includes information about the object URL 24, the video URL 25, and a server apparatus URL 31.

The player unit 17 serving as replay means as shown in FIG. 1 loads data in the storage unit 18 serving as storage means via the communication network 13, and replays the original video using the original video replay unit 3 and replays the object figure video with the object figure video replay unit 7. In this case, the storage unit 18 means a specific physical medium in which files pointed by various URLs are arranged. The files are arranged in the storage unit 18 by the dedicated editor 14. The server apparatus 8 uses a view information collection server 2 to collect view information from the player unit 17 via the communication network 13, and uses the information statistics processing unit 9 to calculate them. During the transmission from the player unit 17 to the server apparatus 8, user information of a viewer is added at all times. A dedicated statistical viewer 19 serving as output means can display the statistical result provided by the information statistics processing unit 9.

As shown in FIG. 2, file names of user attribute 26 and the project file 23 are transmitted to the player unit 17 via the communication network 13 as Hyper Text Markup Language (HTML) files. The player unit 17 obtains the project file 23, and retrieves the video URL 25 and the display option therefrom.

When the display option is "replay prohibited", a message to that effect is displayed, and the processing is terminated. When the display option is "replay allowed", the original video and the object figure video are obtained from the storage unit 18.

On the basis of the clock signal generated by the clock generation unit 21 of the original video replay unit 3, the current replay clock value is read, and is transmitted to a clock synchronization unit 22 of the object figure video replay unit 7, whereby the clock value of the object figure video replay of the object figure video replay unit 7 is set. The clock value of the object figure video replay unit 7 is synchronized with the clock value of the original video replay unit 3 at all times.

When the original video replay unit 3 starts replay of the original video, the user action monitoring unit 27 transmits the replay start position information of the original video replay unit 3 to the server apparatus 8, and commands a clock generation unit 21 of the original video replay unit 3 to generate a clock. When the original video replay unit 3 stops replay, the user action monitoring unit 27 transmits a replay stop signal of the original video replay unit 3 to the server apparatus 8, and commands the clock generation unit 21 of the original video replay unit 3 to stop the clock. When the original video replay unit 3 resumes replay after the stop of replay, the user action monitoring unit 27 transmits a replay resume signal of the original video replay unit 3 to the server apparatus 8, and the clock generation unit 21 of the original video replay unit 3 commands a new clock generation.

Figure 3:
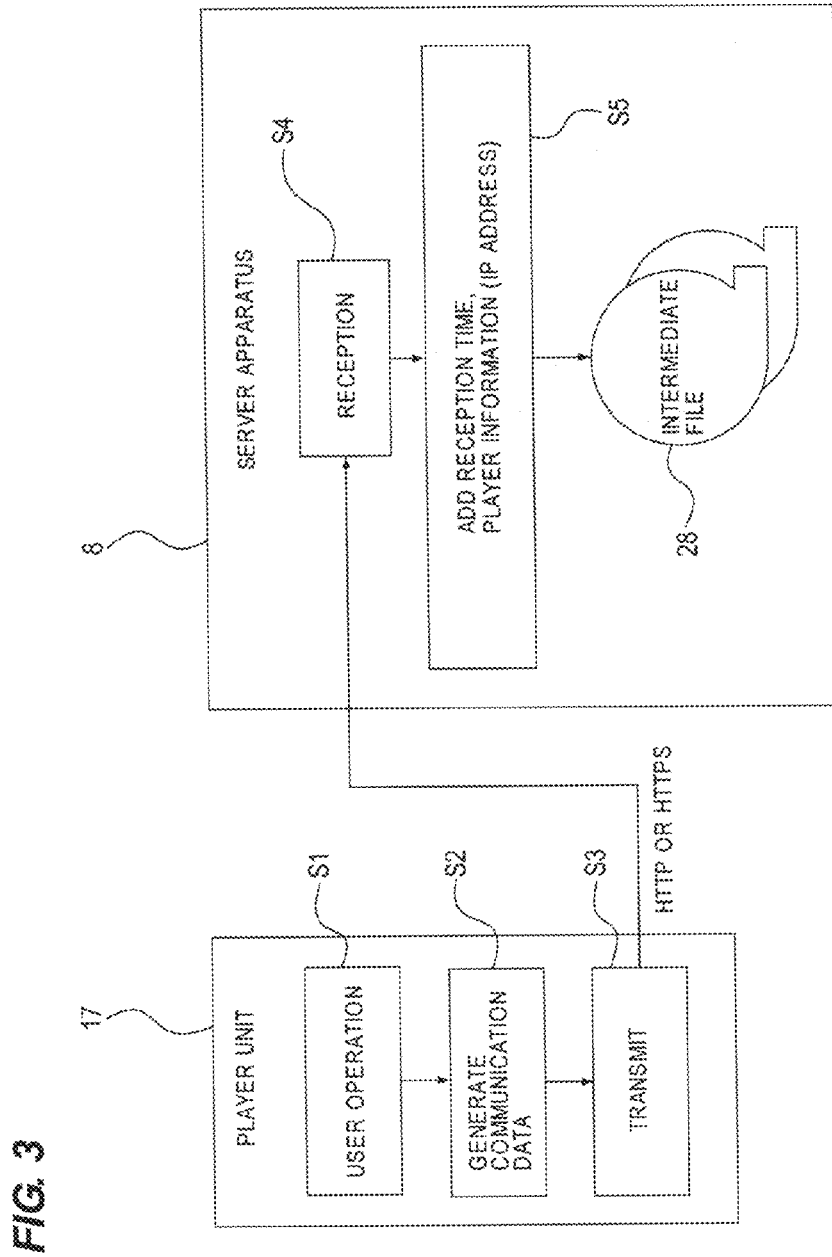
FIG. 3 is a figure for explaining communication between the player unit and a server apparatus.

As shown in FIG. 3, when the viewer performs a given operation on the player unit 17 (step S1), the user action monitoring unit 27 generates communication data such as an operation name, an object FIG. 5 to be clicked, the replay position of the original video by the original video replay unit 3, a project URL, a user, and a referrer of a link (step S2), and the communication unit 12 transmits the communication data via the communication network 13 to the server apparatus 8 (step S3). The server apparatus 8 causes the view information collection server 20 to receive a replay signal, a click signal, a pause signal, and a heartbeat signal serving as an alive-indication signal (signal transmitted by the replay unit with a regular interval) from the player unit 17 (step S4), determines the operation state at the side of the viewer, adds information relating to the player unit 17 such as a reception time and an IP address (step S5), and stores them to an intermediate file 28 as necessary. The intermediate file 28 is generated for each IP address hash value and for each time, so as to facilitate simultaneous processing. On the other hand, the user action monitoring unit 27 serving as the control unit transmits the object FIG. 5 to be clicked and the replay position of the original video by the original video replay unit 3 to the server apparatus 8, and performs control upon determining, as an action set in advance, as to whether a browser is opened, another video is replayed, a caption is displayed, or no action is taken, in accordance with the object FIG. 5 to be clicked in the editor 14.

A "replay start" of the original video by the original video replay unit 3 is transmitted to the server apparatus 8, thus starting replay of the original video and the object figure video provided by the object figure video replay unit 7. When the original video is replayed to the end or the viewer pauses replay, a "replay stop" is transmitted to the server apparatus 8, so as to stop replay of the original video and the object figure video. When the original video is rewound or skipped, a new replay position is transmitted to the server apparatus 8, so that the replay of the original video restarts from a specified time. When a particular object FIG. 5 is clicked, which object FIG. 5 was clicked is transmitted via the communication unit 12 to the server apparatus 8, and in accordance with an action defined in the object FIG. 5, a desired action is executed, e.g., another video is replayed, a browser is opened, or no action is taken.

The object URL 24 set in advance by the editor 14 is read by clicking the particular object FIG. 5, and the object file is loaded from the object information file 16. The loaded object file is decomposed into object figure information, a display period, and a display option, which are saved as object information.

Figure 4:
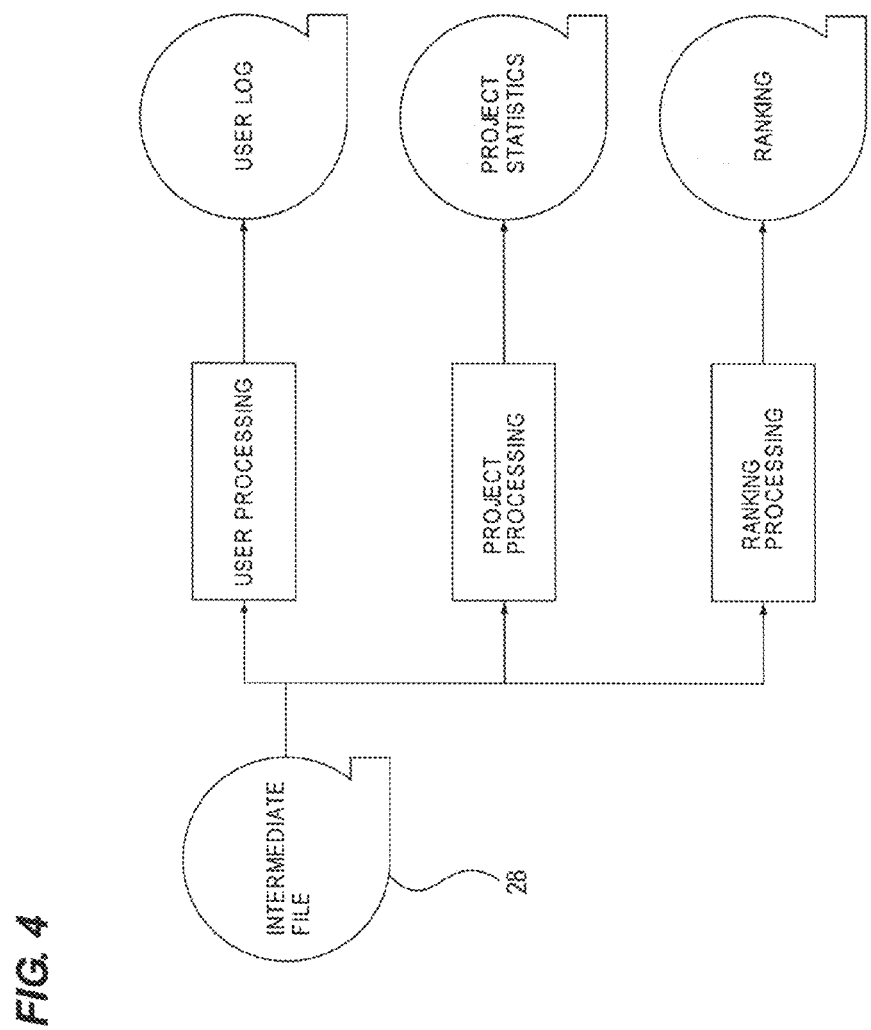
FIG. 4 is a figure for explaining communication between the player unit and the server apparatus.

As shown in FIG. 4, the information statistics processing unit 9 of the server apparatus 8 generates user log, i.e., user behavior in time order on the basis of user processings stored in the intermediate file 28, generates project statistics from, e.g., the number of times and the positions of replays, clicks, and pauses, and an access domain on the basis of project processings, and generates ranking on the basis of projects accessed many times, projects accessed recently, object FIG. 5 clicked many times on the basis of the ranking processing.

A set of object FIG. 5 estimated to be displayed in the current replay clock is calculated on the basis of the display period information defined as dependent information of the object FIG. 5. The display option of each object FIG. 5 is looked up. In this case, hidden object FIG. 5 are not displayed. Object FIG. 5 for which substitute figures such as captions and icons are specified are drawn by the object figure drawing unit 6.

Figure 10A:
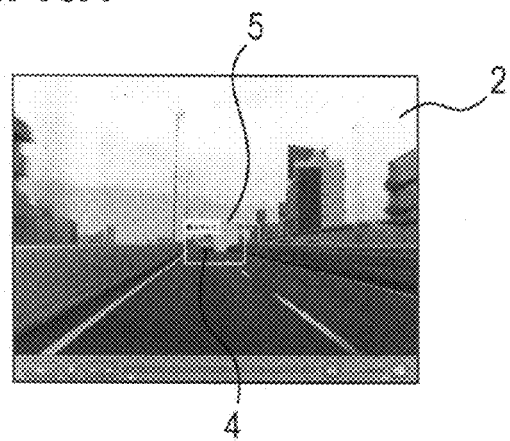
FIG. 10(a) is a figure illustrating how an object figure drawn by an object figure drawing unit tracks a lightweight truck running in a highway, i.e., a particular target object of an original video.

FIGS. 10(*a*) to 12(*b*) show an example of a series of frames, in time series, of an original video replayed by the original video replay unit 3. FIG. 10(*a*) illustrates how an object FIG. 5 drawn by the object figure drawing unit 6 tracks a light-weight truck running in a highway, i.e., a particular target object 4 of the original video. FIG. 10(*b*) illustrates how two object FIG. 5 respectively track a lightweight truck and a silver passenger car running in a highway, i.e., two particular target objects 4 of an original video, and one of them is clicked, so that a video URL 25 of a web site related to the silver passenger car, i.e., the target object 4 thereof, is opened. FIG. 11(*a*) illustrates how an ordinary road traffic jam information video 29 is opened by clicking an object FIG. 5 tracking a traffic information display panel, i.e., a particular target object 4 of the original video. FIG. 11(*b*) illustrates how a destination guide board image 30 is opened by clicking an object FIG. 5 of a destination guide, i.e., a particular target object 4 of the original video.

Figure 12A:
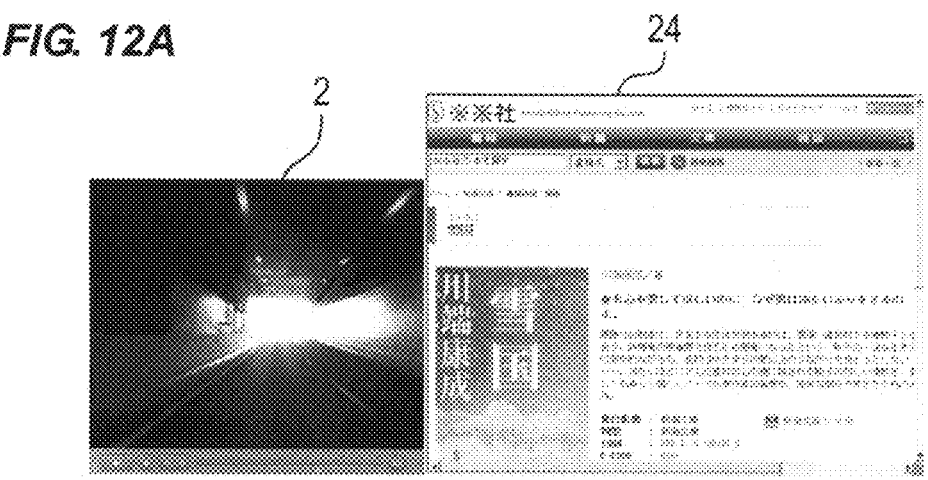
FIG. 12(a) is a figure illustrating how a web site advertising a book "Snow Country" written by Yasunari Kawabata starting with an opening sentence "The train came out of the long tunnel into the snow country." is opened by clicking an object figure tracking a tunnel exit, i.e., a particular target object of an original video.
Figure 12B:
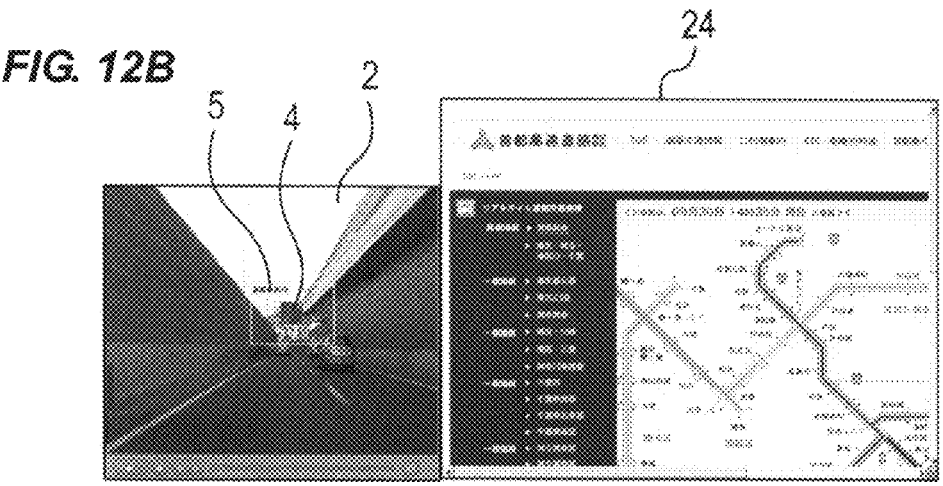
FIG. 12(b) is a figure illustrating how a web site of real time road traffic information provided by Metropolitan Expressway Co., Ltd. is opened by clicking an object figure tracking a Metropolitan Expressway guide board, i.e., a particular target object of an original video.

FIG. 12(*a*) illustrates how an object URL 24 of a web site advertising a book "Snow Country" written by Yasunari Kawabata starting with an opening sentence "The train came out of the long tunnel into the snow country." is opened by clicking an object FIG. 5 tracking a tunnel exit, i.e., a particular target object 4 of the original video. FIG. 12(*b*) illustrates how an object URL 24 of a web site of real time road traffic information provided by Metropolitan Expressway Co. Ltd. is opened by clicking an object FIG. 5 tracking a Metropolitan Expressway guide board, i.e., a particular target object 4 of the original video.

The information providing system using video tracking 1 has an information statistics processing unit 9 for collecting and statistically calculating at least one of the information such as viewing ranking information about a particular target object 4 of the original video including the number of times the object FIG. 5 replayed by the object figure video replay unit 7 is clicked, replay/stop information for each replay time of the original image when an object FIG. 5 is clicked, viewing ranking information about a particular target object of the original video including the number of times each of a plurality of object FIG. 5 arranged on the overlay screen is clicked, and viewing history information of each viewing user.

The server apparatus 8 collects, e.g., viewer's replay start and stop of the original video and viewer's click operation of an object FIG. 5, and the information statistics processing unit 9 statistically processes the collected information as shown in FIG. 13. Then, the processed information is displayed to information-providing person.

Figure 7:
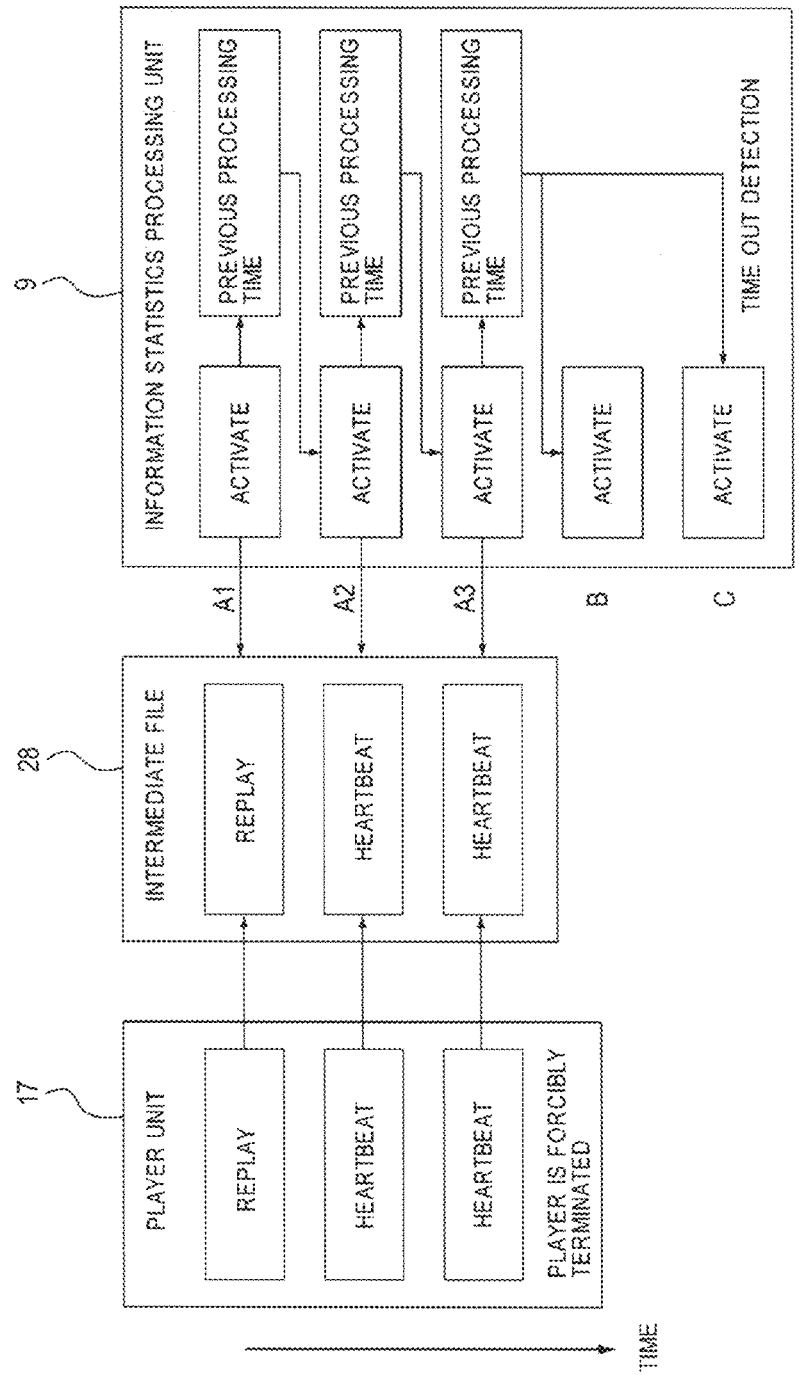
FIG. 7 is a figure for explaining communication between the player unit and the server apparatus.

In the present embodiment, the communication unit 12 is provided in the object figure video replay unit 7, and the communication unit 12 communicates, via the communication network 13 such as the Internet to the server apparatus 8, at least one of the information such as viewing ranking information about a particular target object 4 of the original video including the number of times the object FIG. 5 replayed by the object figure video replay unit 7 is clicked, replay/stop information for each replay time of the original image when an object FIG. 5 is clicked, viewing ranking information about a particular target object 4 of the original video including the number of times each of a plurality of object FIG. 5 arranged on the overlay screen 10 is clicked, and viewing history information of each viewing user, which are collected and statistically calculated by the information statistics processing unit 9. While the object figure video replay unit 7 is operating, the communication unit 12 transmits the heartbeat signal serving as the alive indication signal with a regular interval as shown in FIGS. 5 and 7, so that when the original video replay unit 3 and object figure video replay unit 7 are forcibly terminated by the outside, the server apparatus 8 can recognize termination of viewing by detecting loss of the alive indication signal.

As shown in FIG. 5, when the replay clock elapses a certain time in the player unit 17 (step S11), the user action monitoring unit 27 generates a heartbeat signal serving as the alive indication signal (step S12), and the communication unit 12 transmits the heartbeat signal via the communication network 13 to the server apparatus 8 (step S13). The server apparatus 8 having received the heartbeat signal in step S14 adds information related to the player unit 17 such as a reception time and an IP address in step S15, and stores the information to the intermediate file 28 arranged in the view information collection server 20.

Figure 6:
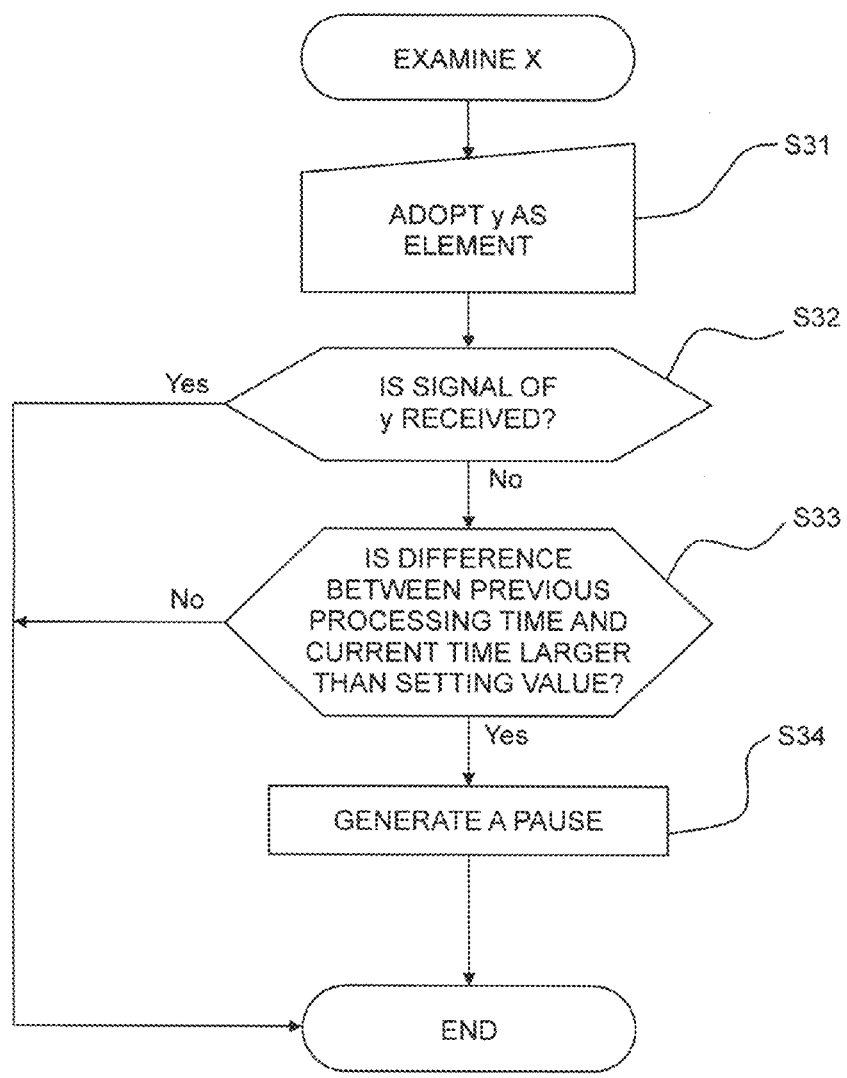
FIG. 6 is a figure for explaining communication between the player unit and the server apparatus.

On the other hand, when the reception data include a replay signal or a heartbeat signal received most recently, the information statistics processing unit 9 stores, as a set X, the IP address and the previous processing time of the received player unit 17 to the intermediate file 28. Then, when the heartbeat signal from the intermediate file 28 is activated with a regular interval, i.e., periodical activation (step S17), step S18 is subsequently performed, in which the information statistics processing unit 9 successively reads the contents of the intermediate file 28 and executes statistic processing. Then, step S19 is subsequently performed, in which the set of IP address of the player unit 17 (set X) is processed. The initial value of the set X is a null set. If the reception data include the replay signal or the heartbeat signal, information about a time at which processing is advanced (hereinafter referred to as "previous processing time") is added to the set X. When the set X already include the replay signal or the heartbeat signal, only the processing time is updated. When the reception data include a pause signal, it is excluded from the set X. Then, the processings of steps S18, S19 are repeated on each signal received until the processings for all the received signals are completed. When the processings have been completed on all the received signals, step S20 is subsequently performed. Examination processing is performed on each element y of the set X stored in the previous step S19. Each element y in the set X is examined by determining whether the intermediate file 28 includes the signal for each element y of the set X. As shown in the flowchart of timeout detection in FIG. 6, each element of the set X is adopted as y in step S31, and a determination is made as to whether the signal of the element y has been received or not in step S32. When the signal of the element y is determined to have been received, the processing is terminated. In step S32, when the signal of the element y is determined not to have been received, a determination is made as to whether a time difference between the previous processing time and the current time is larger than a setting value set in advance in step S33. When the time difference between the previous processing time and the current time is determined to be larger than the setting value set in advance in step S33, step S34 is subsequently performed, and a pause signal is generated and the processing is terminated. When the time difference between the previous processing time and the current time is determined to fall within the value set in advance in the previous step S33, the processing is terminated. Then, the processings of steps S31 to S34 are repeated on each signal received until the processings for all the received signals are completed. When the processings have been completed on all the received signals, step S21 of FIG. 5 is subsequently performed, in which a determination is made as to whether one or more pause signals have been generated or not. When one or more pause signals are determined to have been generated, step S18 explained above is subsequently performed, in which the information statistics processing unit 9 executes statistics processing. When no pause signal is determined to have been generated in step S21, the processing is terminated.

When a pause signal is generated in the examination processing, it is processed temporarily in the program.

As shown in FIG. 7, the heartbeat signal transmitted from the player unit 17 is stored to the intermediate file 28 provided in the view information collection server 20 as it is, and the communication unit of the view information collection server 20 does not recognize the information. The information statistics processing unit 9 is activated with a regular interval by a timer. At times A1 to A3 as shown in FIG. 7, the user action monitoring unit 27 of the player unit 17 generates the replay information or the heartbeat information, and the information statistics processing unit 9 ultimately recognizes the information. For each player unit 17, to which time the processing has been advanced is stored. At the time B as shown in FIG. 7, the player unit 17 is forcibly terminated, and there is not reception data. Therefore, at this occasion, the "previous processing time" is not updated. At the time C as shown in FIG. 7, the "previous processing time" is still the time A3 even when the statistics processing is activated again. When a time from the time A3 to the time C is longer than a time set in advance, the player unit 17 is determined to be forcibly terminated, and pause information is inserted.

Figure 13A:
FIGS. 13(a) to 13(c) are examples of statistical information collected and statistically calculated by an information statistics processing unit.
Figure 13B:
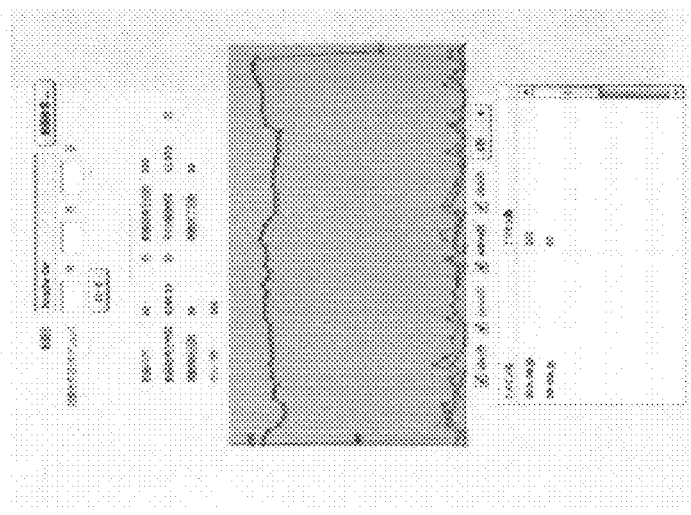
Figure 13C:
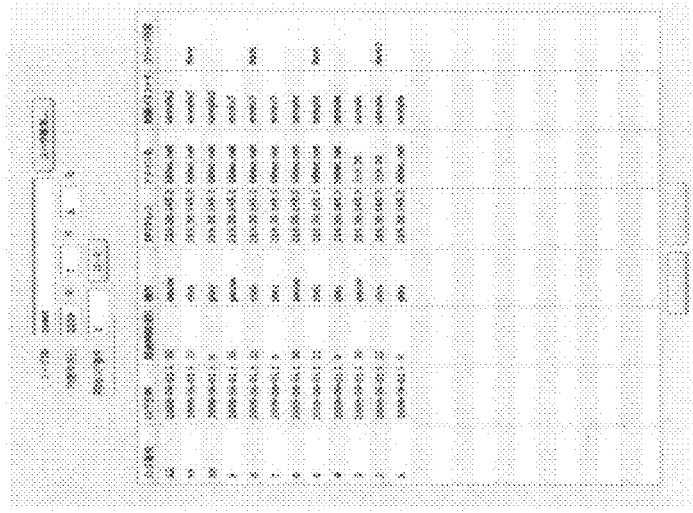

Various kinds of statistical information statistically processed by the information statistics processing unit 9, such as an access ranking information about original video, ranking information about the number of clicks of an object FIG. 5, access domain information, pressing time information of replay, pause, and search buttons, information about the number of clicks of each object FIG. 5, and user access history information, is provided by the statistical viewer 19 serving as the output means to the information-providing person. FIG. 13 shows examples of statistical information collected and statistically calculated by the information statistics processing unit 9. FIG. 13(a) illustrates a viewing and event occurrence state in units of sites, i.e., an example in which it is displayed in the descending order of the number of replays of videos in units of sites, displayed in the descending order of dates of replays of the videos within the site, and displayed in the descending order of the number of clicks of the object FIG. 5. FIG. 13(b) is an event occurrence state in units of videos, i.e., an example in which elapsed times since viewers click object FIG. 5 and calculation results in units of clicked object FIG. 5 are displayed with the start point of the original video being a base point. FIG. 13(c) illustrates a viewing history in units of user classes, i.e., an example in which viewer's viewing behavior is displayed in unit of day, and a time when the viewer starts viewing, a clicked object FIG. 5 and a time when the viewer clicks the object FIG. 5, and times when the original video is paused or resumed are displayed.

According to the above configuration, the overlay screen 10, in which control information according to purpose of providing predetermined information is provided on the original video image displayed within the original video screen 2, is configured to be superimposed on the original video screen 2 and configured to be able to be displayed in synchronization with the original video. Using the object FIG. 5 serving as the control information arranged on the overlay screen 10 superimposed on the original video screen 2, predetermined information can be provided without editing and processing the original video. Instead of the object FIG. 5 serving as the control information, the overlay screen 10 may be divided into a plurality of blocks in a lattice form, and meaning is defined in each block, so that it may be configured as a selection screen such as a questionnaire survey screen and a voting screen for a viewer.

Further, the coordinate calculation unit 11 can calculate coordinate information at a replay clock at which the particular target object 4 is currently displayed, from at least the initial image and the last image in the period in which the particular target object 4 of the original video is displayed within the original video screen 2. Then, on the basis of the coordinate information calculated by the coordinate calculation unit 11, the object figure drawing unit 6 draws the object FIG. 5 superimposed on the original video screen 2 in the overlay screen 10 and adds the control information to the object FIG. 5. Then, the object figure video replay unit 7 can replay an object figure video drawn by the object figure drawing unit 6 in synchronization with the original video replayed by the original video replay unit 3.

Further, by clicking an object FIG. 5, desired information can be provided by opening a predetermined web site set in advance related to the particular target object 4 of the original video, predetermined another video, predetermined advertisement information, or the like.

Further, the information statistics processing unit 9 can collect and statistically calculate, as necessary, viewing ranking information about a particular target object 4 of the original video including the number of times the object FIG. 5 replayed by the object figure video replay unit 7 is clicked, replay/stop information for each replay time of the original image when an object FIG. 5 is clicked, viewing ranking information about a particular target object 4 of the original video including the number of times each of a plurality of object FIG. 5 arranged on the overlay screen is clicked, and viewing history information of each viewing user. When the above information is output, useful statistical data about the view information of the original video can be obtained, and this enables bidirectional use by the video provider and by the video viewer.

Further, while the object figure video replay unit 7 is operating, the communication unit 12 transmits the heartbeat signal serving as the alive indication signal with a regular interval, so that when the original video replay unit 3 and object figure video replay unit 7 are forcibly terminated by the outside, e.g., abnormal termination of a personal computer and the like of the viewer, the server apparatus 8 can recognize termination of viewing by detecting loss of the alive indication signal. Therefore, this prevents the server apparatus 8 from falsely recognizing that the replay of the object figure video is continuing when monitoring is performed by an ordinary method.

Industrial Applicability

As an example of utilization, the present invention can be applied to an information providing system using video tracking.

Description of Reference Numerals 1 information providing system
2 original video screen
3 original video replay unit
4 target object
5 object figure (control information)
6 object figure drawing unit
7 object figure video replay unit
8 server apparatus
9 information statistics processing unit
10 overlay screen
11 coordinate calculation unit
12 communication unit
13 communication network
14 editor
15 video file
16 object information file
17 player unit
18 storage unit 19 statistical viewer
20 view information collection server
21 clock generation unit
22 clock synchronization unit
23 project file
24 object URL
25 video URL
26 user attribute
27 user action monitoring unit
28 intermediate file
29 ordinary road traffic jam information video
30 destination guide board image
31 server apparatus URL

The invention claimed is:

1. An information providing system using video tracking, wherein a transparent or semitransparent overlay screen, in which control information according to a purpose of providing predetermined information is provided on a target object represented by an original video image displayed once or a plurality of times according to scenes within an original video screen, is configured to be superimposed on the original video screen and configured to be displayed in synchronization with the original video, the information providing system using video tracking comprising:

an original video replay unit for replaying an original video;

an object figure drawing unit for drawing an object figure being defined on the target object of the original video in synchronization with the original video replayed by the original video replay unit; wherein the object figure drawn by the object figure drawing unit is superimposed on the original video;

an object figure video replay unit for replaying a target object figure video drawn by the object figure drawing unit;

a clock generation unit provided in the original video replay unit and generating a clock signal; and a clock synchronization unit provided in the object figure video replay unit, wherein a current replay clock value is read on the basis of the clock signal generated by the clock generation unit of the original video replay unit, and is transmitted to the clock synchronization unit of the object figure video replay unit so that a clock value of an object figure video replay of the object figure replay unit is set, and the clock value of the object figure video replay unit is synchronized with the replay clock value of the original video replay unit.

2. The information providing system using video tracking according to claim 1, further comprising:

a coordinate calculation unit for calculating coordinate information at a replay clock at which a particular target object is currently displayed, from at least an initial image and a last image in a period in which the particular target object of the original video reproduced by the original video replay unit is displayed within the original video screen;

wherein the object figure drawing unit draws the object figure for specifying the target object of the original video by superimposing on the original video screen in the overlay screen on the basis of the coordinate information calculated by the coordinate calculation unit and adding the control information to the object figure; and the object figure video replay unit replays an object figure video drawn by the object figure drawing unit in synchronization with the original video replayed by the original video replay unit.

3. The information providing system using video tracking according to claim 2, further comprising a control unit for executing at least one of the following operations, opening a predetermined web site set in advance, opening another predetermined video, and opening predetermined advertisement information, by clicking the object figure.

4. The information providing system using video tracking according to claim 2, further comprising an information statistics processing unit for collecting and statistically calculating at least one of information such as viewing ranking information about a particular target object of the original video including a number of times the object figure replayed by the object figure video replay unit is clicked, replay/stop information for each replay time of the particular target object of the original image when the object figure is clicked, viewing ranking information about a particular target object of the original video including a number of times each of a plurality of object figures arranged on the overlay screen is clicked, and viewing history information of each viewing user.

5. The information providing system using video tracking according to claim 3, wherein a communication unit is provided in the object figure video replay unit, and the communication unit communicates, via the Internet to the server apparatus, at least one of information such as viewing ranking information about a particular target object of the original video including a number of times the object figure reproduced by the object figure video replay unit is clicked, replay/stop information for each replay time of the original image when the object figure is clicked, viewing ranking information about a particular target object of the original video including a number of times each of a plurality of object figures arranged on the overlay screen is clicked, and viewing history information of each viewing user, which are collected and statistically calculated by the information statistics processing unit, and while the object figure video replay unit is operating, the communication unit transmits an alive indication signal with a regular interval, so that when the original video replay unit and object figure video replay unit are forcibly terminated by an outside, the server apparatus can recognize termination of viewing by detecting loss of the alive indication signal.

6. The information providing system using video tracking according to claim 3, further comprising an information statistics processing unit for collecting and statistically calculating at least one of information such as viewing ranking information for each replay time about a particular target object of the original video including a number of times the object figure replayed by the object figure video replay unit is clicked, replay/stop information for each replay time of the original image when the object figure is clicked, viewing ranking information about a particular target object of the original video including a number of times each of a plurality of object figures arranged on the overlay screen is clicked, and viewing history information of each viewing user.

* * * * *